US011208898B1

(12) United States Patent
Schneider et al.

(10) Patent No.: US 11,208,898 B1
(45) Date of Patent: Dec. 28, 2021

(54) TURBINE BLADE COOLING HOLE ARRANGEMENT

(71) Applicant: Raytheon Technologies Corporation, Farmington, CT (US)

(72) Inventors: Alex J. Schneider, South Glastonbury, CT (US); Parth Jariwala, Cambridge, MA (US); Nicholas M. LoRicco, Windsor, CT (US); Ryan Lundgreen, Granby, CT (US); David A. Niezelski, Manchester, CT (US); Jeffrey T. Morton, Manchester, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 0 days.

(21) Appl. No.: 16/780,368

(22) Filed: Feb. 3, 2020

Related U.S. Application Data

(60) Provisional application No. 62/809,247, filed on Feb. 22, 2019, provisional application No. 62/800,724, filed on Feb. 4, 2019.

(51) Int. Cl.
 *F01D 5/18* (2006.01)
 *F01D 5/02* (2006.01)

(52) U.S. Cl.
 CPC .............. *F01D 5/18* (2013.01); *F01D 5/02* (2013.01); *F05D 2220/32* (2013.01); *F05D 2230/10* (2013.01); *F05D 2260/221* (2013.01)

(58) Field of Classification Search
 CPC .......... F01D 5/18; F01D 5/02; F05D 2220/32; F05D 2230/10; F05D 2260/221
 See application file for complete search history.

(56) References Cited

U.S. PATENT DOCUMENTS

| 8,206,114 | B2 | 6/2012 | Spangler et al. | |
| 9,062,556 | B2 | 6/2015 | Papple et al. | |
| 9,121,289 | B2 | 9/2015 | Plante et al. | |
| 9,581,029 | B2 | 2/2017 | Papple et al. | |
| 10,060,268 | B2 | 8/2018 | Bradshaw | |
| 2014/0010632 | A1* | 1/2014 | Spangler | F01D 5/186 415/115 |
| 2014/0219817 | A1 | 8/2014 | Papple et al. | |
| 2014/0321961 | A1 | 10/2014 | Beattie et al. | |
| 2015/0037732 | A1 | 2/2015 | Zhang et al. | |
| 2015/0192021 | A1* | 7/2015 | Spangler | F02C 7/18 416/96 R |
| 2015/0211376 | A1* | 7/2015 | Riley | F01D 5/186 415/115 |
| 2015/0377032 | A1 | 12/2015 | Lewis et al. | |
| 2016/0084091 | A1* | 3/2016 | Papple | F01D 5/186 416/95 |

(Continued)

FOREIGN PATENT DOCUMENTS

EP 3088100 A1 11/2016

*Primary Examiner* — Justin D Seabe
*Assistant Examiner* — Theodore C Ribadeneyra
(74) *Attorney, Agent, or Firm* — Cantor Colburn LLP

(57) ABSTRACT

A turbine blade for a gas turbine engine. The turbine blade having a plurality of cooling holes defined therein, wherein the plurality of cooling holes are located in the turbine blade according to the coordinates of Table 1 and at least some of the plurality of cooling holes are located in an airfoil of the turbine blade.

20 Claims, 5 Drawing Sheets

(56) References Cited

U.S. PATENT DOCUMENTS

| | | | |
|---|---|---|---|
| 2016/0201473 A1* | 7/2016 | Spangler | F02C 3/04 |
| | | | 60/806 |
| 2018/0187554 A1 | 7/2018 | Hough et al. | |
| 2019/0203612 A1* | 7/2019 | McMahon | F01D 25/12 |
| 2019/0292940 A1* | 9/2019 | Cosher | F01D 9/065 |
| 2019/0323362 A1* | 10/2019 | Arisi | F01D 5/189 |

* cited by examiner

TURBINE BLADE COOLING HOLE ARRANGEMENT

CROSS REFERENCE TO RELATED PATENT APPLICATIONS

This application claims the benefit of U.S. Provisional Patent Application Nos. 62/800,724 filed on Feb. 4, 2019 and 62/809,247 filed on Feb. 22, 2019, the contents each of which are incorporated herein by reference thereto.

BACKGROUND

Various embodiments of the present disclosure relate generally to a blade for a gas turbine engine and, in one embodiment, to a cooling hole distribution for blades of a turbine section of the gas turbine engine.

A gas turbine engine typically includes a fan section, a compressor section, a combustor section and a turbine section. Air entering the compressor section is compressed and delivered into the combustion section where it is mixed with fuel and ignited to generate a high-energy exhaust gas flow. The high-energy exhaust gas flow expands through the turbine section to drive the compressor and the fan section. The compressor section typically includes low and high pressure compressors, and the turbine section typically includes low and high pressure turbines.

Both the compressor and turbine sections include rotating blades alternating between stationary vanes. The vanes and rotating blades in the turbine section extend into the flow path of the high-energy exhaust gas flow. All structures within the exhaust gas flow path are exposed to extreme temperatures. A cooling air flow is therefore utilized over some structures to improve durability and performance.

Accordingly, it is desirable to provide cooling air to turbine blades of a gas turbine engine.

BRIEF DESCRIPTION

Disclosed is a turbine blade for a gas turbine engine. The turbine blade having a plurality of cooling holes defined therein, wherein the plurality of cooling holes are located in the turbine blade according to the coordinates of Table 1 and at least some of the plurality of cooling holes are located in an airfoil of the turbine blade.

In addition to one or more of the features described above, or as an alternative to any of the foregoing embodiments, the turbine blade is a first stage turbine blade of a high pressure turbine of the gas turbine engine.

In addition to one or more of the features described above, or as an alternative to any of the foregoing embodiments, at least some of the plurality of cooling holes have a hole diameter in a range of 0.010 inches to 0.020 inches.

In addition to one or more of the features described above, or as an alternative to any of the foregoing embodiments, the turbine blade includes a platform and a root, the airfoil extending from the platform, wherein the platform, the root, and the airfoil are cast as a single part.

In addition to one or more of the features described above, or as an alternative to any of the foregoing embodiments, at least some of the plurality of cooling holes have a hole diameter in a range of 0.010 inches to 0.020 inches.

In addition to one or more of the features described above, or as an alternative to any of the foregoing embodiments, the turbine blade includes a platform and a root, the airfoil extending from the platform, wherein the platform, the root, and the airfoil are cast as a single part.

Also disclosed is a turbine blade rotor assembly for a gas turbine engine. The rotor assembly having: a rotor disk; a plurality of turbine blades secured to the rotor disk, each turbine blade having a plurality of cooling holes defined therein, wherein the plurality of cooling holes are located in each turbine blade according to the coordinates of Table 1 and at least some of the plurality of cooling holes are located in an airfoil of the turbine blade.

In addition to one or more of the features described above, or as an alternative to any of the foregoing embodiments, the turbine blade rotor assembly is a first stage turbine blade rotor assembly of a high pressure turbine of the gas turbine engine.

In addition to one or more of the features described above, or as an alternative to any of the foregoing embodiments, at least some of the plurality of cooling holes have a hole diameter in a range of 0.010 inches to 0.020 inches.

In addition to one or more of the features described above, or as an alternative to any of the foregoing embodiments, each of the plurality of turbine blades further comprise a platform and a root, the airfoil extending from the platform, wherein the platform, the root, and the airfoil are cast as a single part.

In addition to one or more of the features described above, or as an alternative to any of the foregoing embodiments, at least some of the plurality of cooling holes have a hole diameter in a range of 0.010 inches to 0.020 inches.

In addition to one or more of the features described above, or as an alternative to any of the foregoing embodiments, each of the plurality of turbine blades further comprise a platform and a root, the airfoil extending from the platform, wherein the platform, the root, and the airfoil are cast as a single part.

Also disclosed herein is a method of cooling a suction side of an airfoil of a turbine blade of a gas turbine engine. The method including the steps of: forming a plurality of cooling holes in the turbine blade, wherein the plurality of cooling holes are located in the turbine blade according to the coordinates of Table 1 and at least some of the plurality of cooling holes are located in an airfoil of the turbine blade.

In addition to one or more of the features described above, or as an alternative to any of the foregoing embodiments, the turbine blade is a first stage turbine blade of a high pressure turbine of the gas turbine engine.

In addition to one or more of the features described above, or as an alternative to any of the foregoing embodiments, at least some of the plurality of cooling holes have a hole diameter in a range of 0.010 inches to 0.020 inches.

In addition to one or more of the features described above, or as an alternative to any of the foregoing embodiments, the turbine blade further comprises a platform and a root, the airfoil extending from the platform, wherein the platform, the root, and the airfoil are cast as a single part.

In addition to one or more of the features described above, or as an alternative to any of the foregoing embodiments, at least some of the plurality of cooling holes have a hole diameter in a range of 0.010 inches to 0.020 inches.

In addition to one or more of the features described above, or as an alternative to any of the foregoing embodiments, the turbine blade further comprises a platform and a root, the airfoil extending from the platform, wherein the platform, the root, and the airfoil are cast as a single part.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
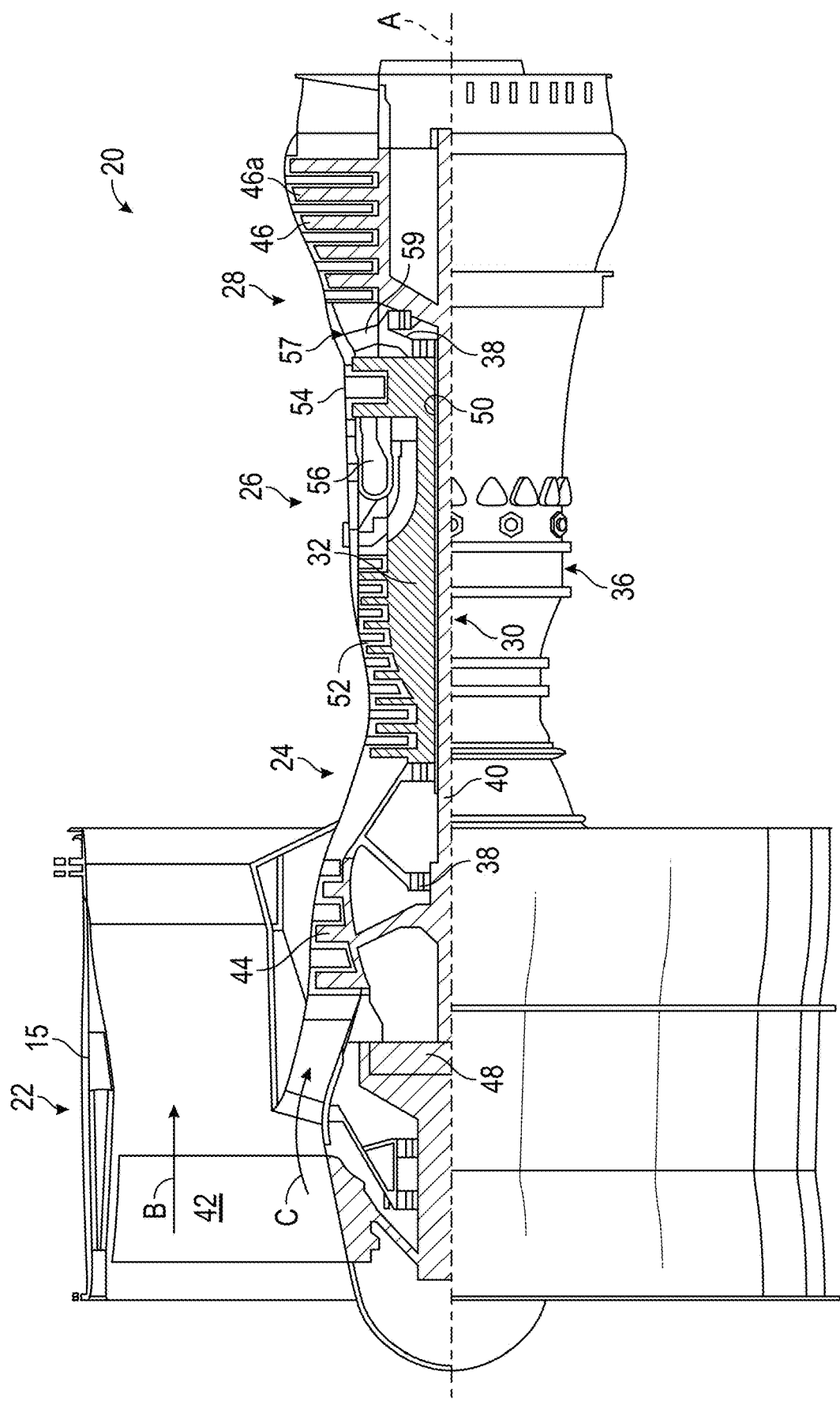
FIG. 1 is a schematic, partial cross-sectional view of a gas turbine engine in accordance with this disclosure.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include other systems or features. The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first or low pressure compressor 44 and a first or low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second or high pressure compressor 52 and a second or high pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present disclosure is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8Mach and about 35,000 feet (10,688 meters). The flight condition of 0.8 Mach and 35,000 ft (10,688 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °\ R)/(518.7°\ R)]^{0.5}$. The "Low corrected fan tip speed" as disclosed herein according to one non-limiting embodiment is less than about 1150 ft/second (350.5 m/sec).

In a further example, the fan 42 includes less than about 26 fan blades. In another non-limiting embodiment, the fan 42 includes less than about 20 fan blades. Moreover, in one further embodiment the low pressure turbine 46 includes no more than about 6 turbine rotors schematically indicated at 46a. In a further non-limiting example the low pressure turbine 46 includes about 3 turbine rotors. A ratio between the number of blades of the fan 42 and the number of low pressure turbine rotors 46a is between about 3.3 and about 8.6. The example low pressure turbine 46 provides the driving power to rotate the fan section 22 and therefore the relationship between the number of turbine rotors 46a in the low pressure turbine 46 and the number of blades in the fan section 22 discloses an example gas turbine engine 20 with increased power transfer efficiency.

Turbine components in a gas turbine engine often require active cooling as temperatures in the gaspath exceed the melting point of the constituent components. However, as work is required to pressurize coolant flow prior to being used to cool components, the result of adding cooling flow decreases the efficiency of the turbine. Thus, when designing turbine components, flow must be used sparingly to meet part and module life targets without reducing performance targets to unacceptable levels.

In one exemplary embodiment, a turbine blade includes an airfoil, as well as an inner platform endwall. Each surface contains a plurality of cooling holes that break from the interior or backside surface of the blade to the exterior gaspath side. These holes break out on the external surface of the airfoil in accordance with the Cartesian coordinate values of X, Y, Z as set forth in Table 1. These values are reference dimensions from a designed point on the midpoint of the inner diameter edge of the leading edge root face.

Figure 2:
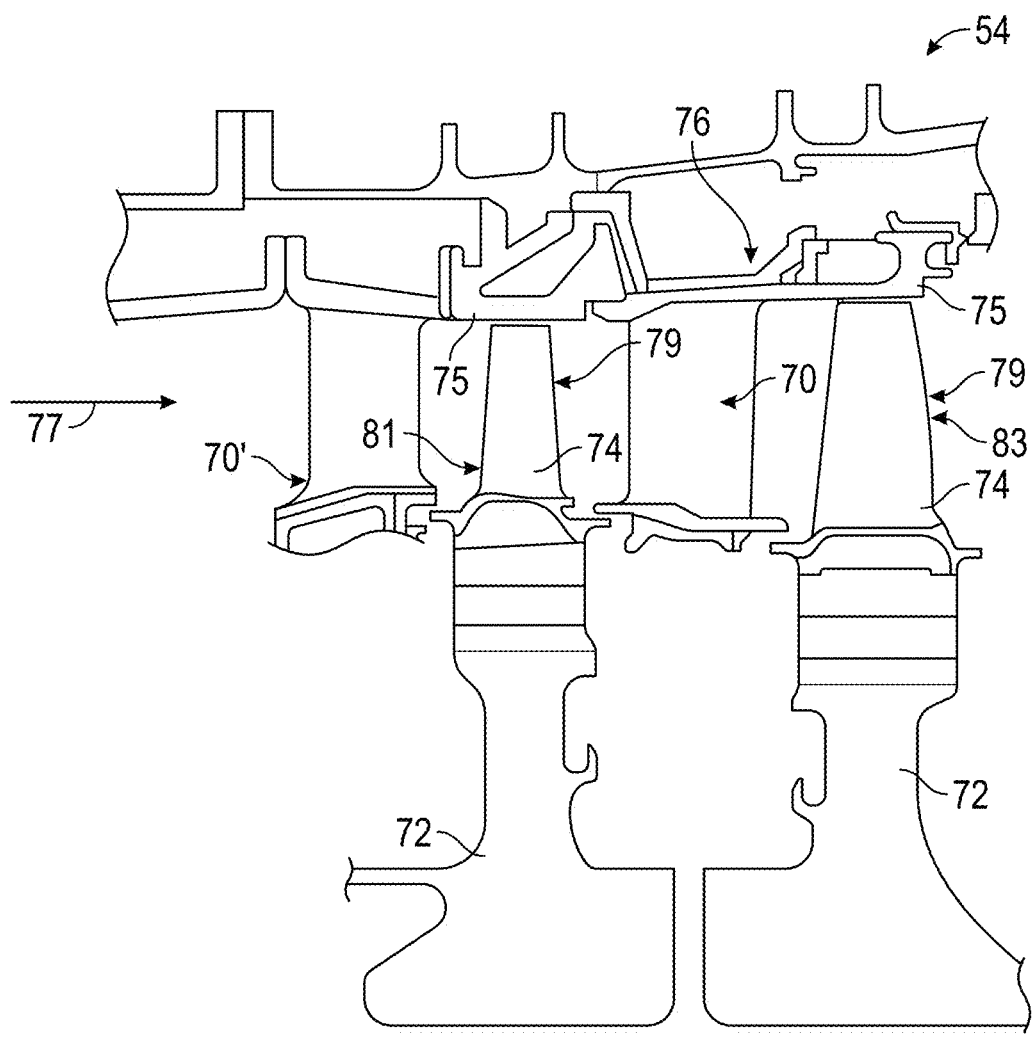
FIG. 2 is a schematic view of a two-stage high pressure turbine of the gas turbine engine.

FIG. 2 illustrates a portion of the high pressure turbine (HPT) 54. FIG. 2 also illustrates a high pressure turbine stage vanes 70 one of which (e.g., a first stage vane 70') is located forward of a first one of a pair of turbine disks 72 each having a plurality of turbine blades 74 secured thereto. The turbine blades 74 rotate proximate to blade outer air seals (BOAS) 75 which are located aft of the vane 70 or first stage vane 70'. The other vane 70 is located between the pair of turbine disks 72. This vane 70 may be referred to as the second stage vane. As used herein the first stage vane 70' is the first vane of the high pressure turbine section 54 that is located aft of the combustor section 26 and the second stage vane 70 is located aft of the first stage vane 70' and is located between the pair of turbine disks 72. In addition, blade outer air seals (BOAS) 75 are disposed between the first stage vane 70' and the second stage vane 70. The high pressure turbine stage vane 70 (e.g., second stage vane) or first stage vane 70' is one of a plurality of vanes 70 that are positioned circumferentially about the axis A of the engine in order to provide a stator assembly 76. Hot gases from the combustor section 26 flow through the turbine in the direction of arrow 77. Although a two-stage high pressure turbine is illustrated other high pressure turbines are considered to be within the scope of various embodiments of the present disclosure.

The high pressure turbine (HPT) is subjected to gas temperatures well above the yield capability of its material. In order to mitigate detrimental effects due to such high temperature, surface film-cooling is typically used to cool the blades and vanes of the high pressure turbine. Surface film-cooling is achieved by supplying cooling air from the cold backside through cooling holes drilled on the high pressure turbine components. Cooling holes are strategically designed and placed on the vane and turbine components in-order to maximize the cooling effectiveness and minimize the efficiency penalty.

Referring now to at least FIGS. 1-4C, a turbine blade 74 is illustrated. As mentioned above, turbine blades 74 are secured to a turbine disk 72 that is configured to rotate about axis A. The turbine disk 72 and its turbine blades 74 may be referred to as a turbine rotor assembly 79. The turbine blades 74 and their associated disks 72 are located behind or downstream from either the first stage vane 70' or the second stage vane 70. The turbine blades located behind the first stage vane 70' and in front of the second stage vane may be referred to first stage turbine blades 81 and the turbine blades located behind the second stage vane 70 may be referred to second stage turbine blades 83.

Each turbine blade 74 has an airfoil 80 that extends radially from a platform 82. When the turbine blade 74 is secured to the turbine disk 72 and the disk 72 is secured to the engine 20, the airfoil 80 is further away from axis A than the platform 82. In other words, the airfoil 80 extends radially away from the platform 82 such that the airfoil 80 is at a further radial distance from the axis A than the platform 82.

Figure 3:
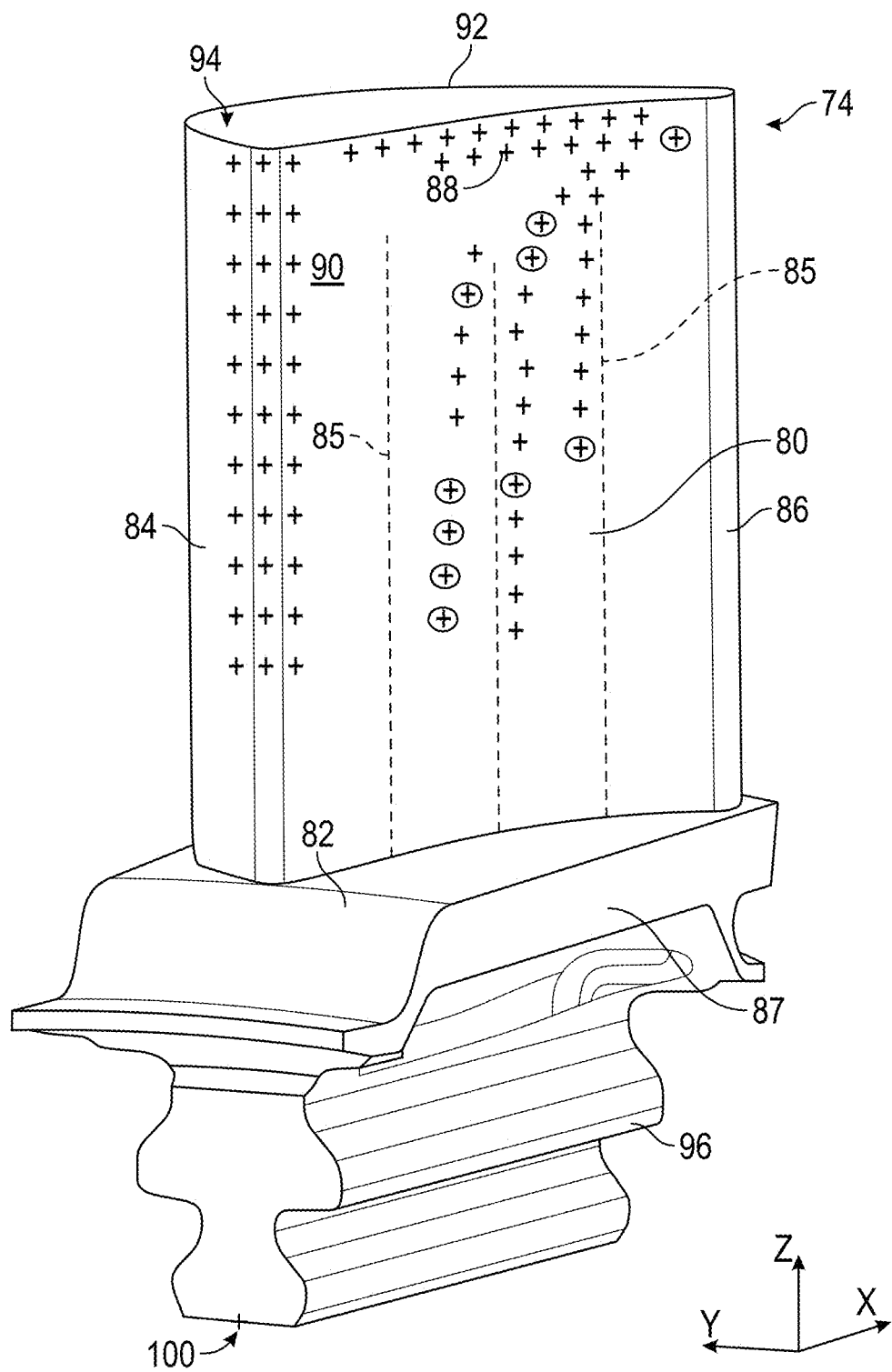
FIG. 3 is a perspective view of a turbine blade of the two-stage high pressure turbine according to an embodiment of the present disclosure.
Figure 4A:
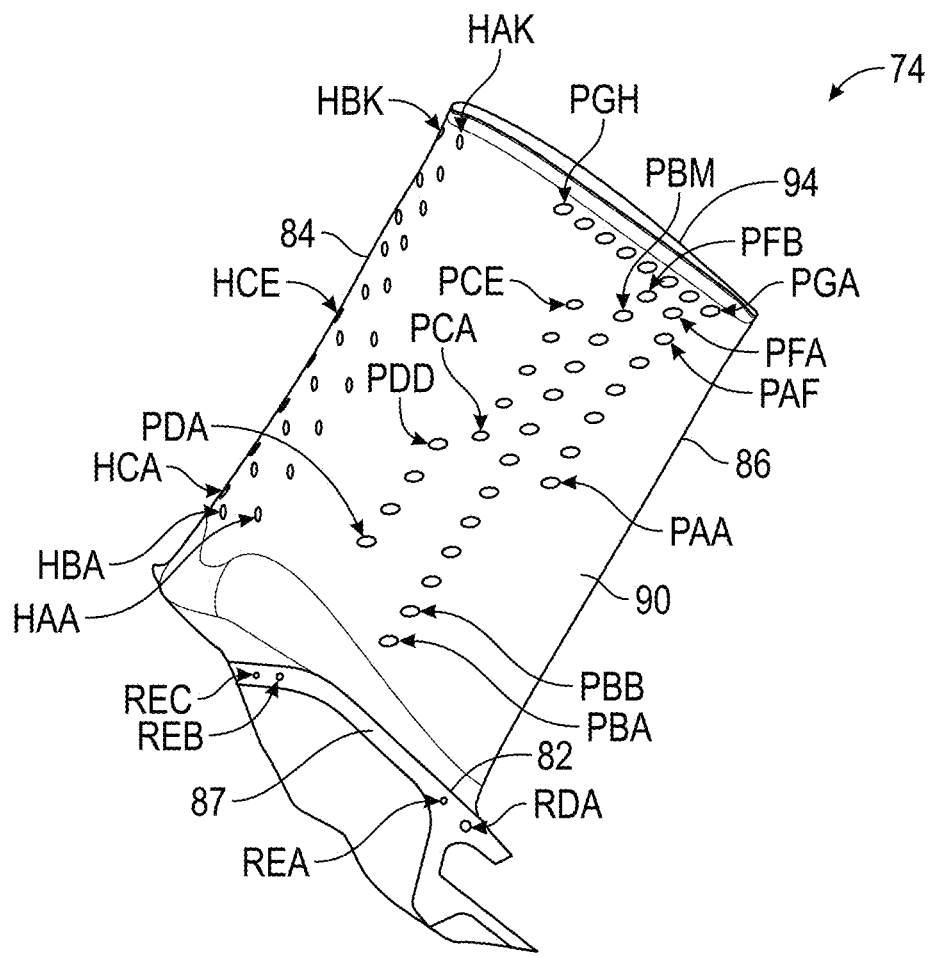
FIGS. 4A-4C are perspective views of portions of the turbine blade illustrated in FIG. 3.
Figure 4B:
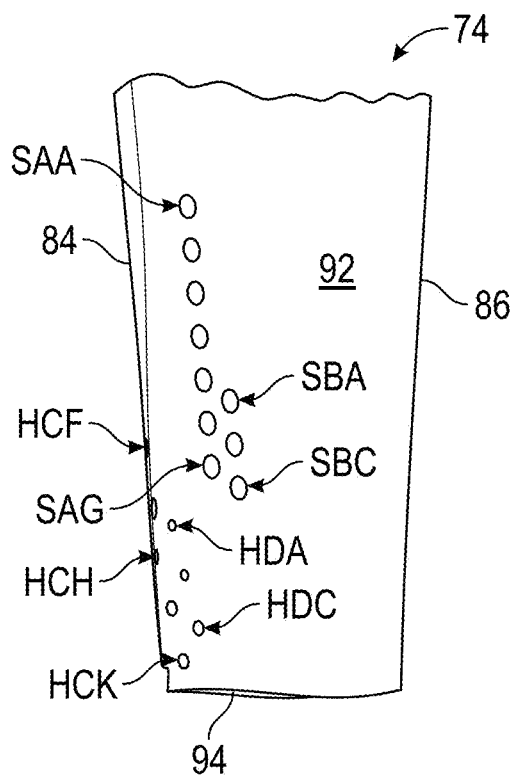
Figure 4C:
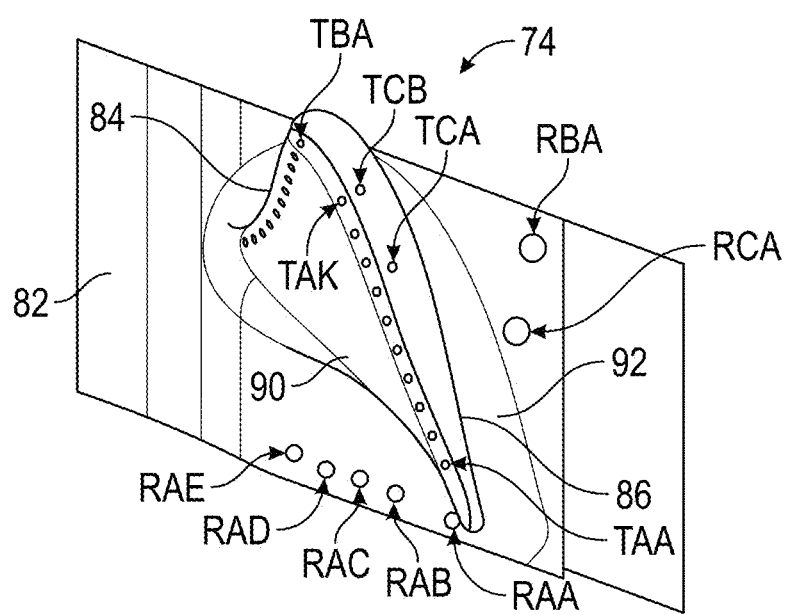

The airfoil 80 has a leading edge 84 and a trailing edge 86. In addition, the airfoil 80 is provided with an internal cavity or cavities 85 that is/are in fluid communication with a source of cooling air or fluid. The airfoil 80 has a plurality of cooling openings or film cooling holes 88 that are in fluid communication with the internal cavity 85 in order to provide a source of cooling fluid or air to portions of the airfoil 80 such that film cooling can be provided in desired locations. In FIG. 3 the cooling openings 88 are illustrated with a "+" symbol that corresponds to the centerline of the cooling film holes 88 where the holes open at the surface. Due to manufacturing tolerances, the film cooling holes 88 may have a diametrical surface tolerance, relative to the specified coordinates, of 0.200 inches (5.0 mm). This tolerance may be represented by a circle around each "+" symbol. That is, the circle represents the spatial envelope in which the film cooling hole 88 is located. For clarity, only several such circles are illustrated in FIG. 3. In a further non-limiting example, a minimum spacing is provided between adjacent film cooling holes 88. In one example, the minimum spacing between edges of adjacent film cooling holes 88 is at least 0.015 inch (0.38 mm).

The airfoil 80 has a pressure side 90 and a suction side 92 each of which extends between the leading edge 84 and the trailing edge 86. The airfoil also terminates at a tip 94 that is furthest radially from the platform 82. Also shown in at least FIG. 3, is a root or root portion 96. Root or root portion 96 is used to secure the turbine blade 74 to the turbine disk 72. In one embodiment, the airfoil 80 may be integrally formed or cast with the platform 82 and/or the root portion 96. In other words, the turbine blade 74 including the airfoil 80, the platform 82 and the root 96 may be cast as a single part.

As mentioned above, turbine components are subjected to gas temperatures well above the yield capability of its material. In accordance with the present disclosure and in one embodiment the cooling holes 88 may be formed into the configurations illustrated in at least FIGS. 3-4C and as described in Table 1 below. In one embodiment, these cooling holes 88 are located on a turbine blade 74 that is one of a plurality of blades that are located in a first stage rotor disk 72. In other words and in one embodiment, the turbine blade 74 with the aforementioned holes 88 is a first stage turbine blade 81 located behind a first stage vane 70' of the high pressure turbine 54 wherein the cooling holes 88 of Table 1 are located on first stage turbine blade 81.

As such and in one embodiment, the first stage rotor disk 72 will comprise a plurality of turbine blades 74 each having a plurality of cooling holes 88. The cooling holes 88 may be circular or conical in shape and can be oriented axially or at a radial axis relative to the engine axis A. Of course, other numerous configurations are considered to be within the scope of various embodiments of the present disclosure. In one embodiment, these cooling holes 88 may also be used in combination with other cooling holes located throughout the turbine blade 74. These other cooling holes may be located on anyone of the leading edge 84, trailing edge 86, tip 94, platform 82, pressure side 90, and suction side 92 of the turbine blade 74. Alternatively, the turbine blade 74 may be formed with only the cooling hole locations identified in Table 1.

In one non-limiting embodiment, the dimensions of all of the aforementioned holes are in the range of 0.010 inches to 0.020 inches. Of course, ranges greater or less than the aforementioned ranges are considered to be within the scope of various embodiments of the present disclosure.

The locations of the holes 88 in airfoil 80 may further be defined by the dimensions of Table 1, wherein the center of each hole 88 is provided by the following Cartesian coordinates. In Table 1, the X, Y and Z dimensions refer to the distance between centers of the holes in the X, Y and Z directions respectively and a point of origin O on the turbine blade 74, which is defined by reference numeral 100 in FIG. 3. The X, Y and Z axes respectively correspond to the axial (X), circumferential (Y) and radial (Z) directions shown in at least FIG. 3. In addition, the location of the holes 88 in Table 1 are located on an exterior surface of the airfoil and extend inwardly through the wall of the airfoil 80 so that they are in fluid communication with internal cavities 85 of the airfoil 80 so that cooling fluid may be applied to the exterior surface of the airfoil in order to provide film cooling to the airfoil 80. In one embodiment and as illustrated in FIG. 3, the point of origin 100 is located at a center point of an inner diameter edge of a forward root face of the root 96.

In one non-limiting embodiment, the center of the impingement holes or cooling holes has a true position tolerance of up to ±0.060 inches due to manufacturing and assembly tolerances. In yet another non-limiting embodiment, the center of the impingement holes or cooling holes has a true position tolerance of up to ±0.040 inches due to manufacturing and assembly tolerances. In still yet another embodiment, the center of the impingement holes or cooling holes has a true position tolerance of up to ±0.020 inches due to manufacturing and assembly tolerances.

The film cooling holes 88 are arranged to produce boundary layers of cooling fluid on the gas path side of the platform 82 and external surfaces of the airfoil 80. In addition, they are also arranged to provide cooling flow to mate faces 87 of the blade 74 such that cooling air is provided to a gap located between adjacent mate faces 87 of adjacent blades 74 when they are secured to the rotor disk 72. As shown in the attached FIGS., portions of the film cooling holes 88 are arranged radially along the airfoil leading edge 84 and axially along the free tip end 94. The film cooling holes or cooling holes 88 can be diffusing holes or cylindrical holes, for example, but are not limited to such geometries. In diffusing hole geometries, the hole area increases as the hole opens to the external surface. Some examples of diffusing holes include, but are not limited to, conical, shaped, and vehr holes. Cylindrical holes have a uniform diameter area along the length of the hole. In further examples, a portion of the film cooling holes 88 are cylindrical holes and another portion are diffusing holes.

TABLE 1

| HOLE ID | X | Y | Z |
|---|---|---|---|
| HAA 1 | 0.305 | 0.001 | 1.470 |
| HAB 2 | 0.329 | 0.020 | 1.615 |
| HAC 3 | 0.343 | 0.045 | 1.758 |
| HAD 4 | 0.364 | 0.070 | 1.900 |
| HAE 5 | 0.374 | 0.107 | 2.043 |
| HAF 6 | 0.357 | 0.167 | 2.186 |
| HAG 7 | 0.354 | 0.209 | 2.311 |
| HAH 8 | 0.360 | 0.232 | 2.416 |
| HAJ 9 | 0.360 | 0.258 | 2.522 |
| HAK 10 | 0.372 | 0.283 | 2.622 |
| RBA 11 | 0.242 | 0.050 | 1.423 |
| HBB 12 | 0.257 | 0.061 | 1.566 |
| HBC 13 | 0.275 | 0.073 | 1.709 |
| HBD 14 | 0.291 | 0.099 | 1.852 |
| HBE 15 | 0.303 | 0.138 | 1.995 |
| HBF 16 | 0.317 | 0.180 | 2.138 |
| HBG 17 | 0.321 | 0.224 | 2.265 |
| HBH 18 | 0.322 | 0.254 | 2.363 |
| HBJ 19 | 0.327 | 0.286 | 2.482 |
| HBK 20 | 0.341 | 0.328 | 2.607 |
| HCA 21 | 0.251 | 0.111 | 1.472 |
| HCB 22 | 0.261 | 0.117 | 1.615 |
| HCC 23 | 0.275 | 0.140 | 1.758 |
| HCD 24 | 0.289 | 0.169 | 1.901 |
| HCE 25 | 0.298 | 0.195 | 2.044 |
| HCF 26 | 0.314 | 0.254 | 2.188 |
| HCG 27 | 0.329 | 0.298 | 2.317 |
| HCH 28 | 0.335 | 0.314 | 2.424 |
| HCJ 29 | 0.365 | 0.353 | 2.532 |
| HCK 30 | 0.392 | 0.383 | 2.642 |
| HDA 31 | 0.367 | 0.340 | 2.358 |
| HDB 32 | 0.393 | 0.364 | 2.463 |
| HDC 33 | 0.422 | 0.380 | 2.574 |
| PAA 34 | 0.757 | −0.492 | 1.952 |
| PAB 35 | 0.754 | −0.487 | 2.052 |
| PAC 36 | 0.751 | −0.484 | 2.152 |
| PAD 37 | 0.747 | −0.481 | 2.252 |
| PAE 38 | 0.743 | −0.484 | 2.353 |
| PAF 39 | 0.739 | −0.491 | 2.458 |
| PBA 40 | 0.657 | −0.337 | 1.376 |
| PBB 41 | 0.660 | −0.338 | 1.476 |
| PBC 42 | 0.663 | −0.337 | 1.575 |
| PBD 43 | 0.667 | −0.336 | 1.675 |
| PBE 44 | 0.673 | −0.336 | 1.775 |
| PBF 45 | 0.677 | −0.335 | 1.875 |
| PBG 46 | 0.681 | −0.337 | 1.975 |
| PBH 47 | 0.685 | −0.340 | 2.075 |
| PBJ 48 | 0.672 | −0.313 | 2.175 |
| PBK 49 | 0.676 | −0.325 | 2.275 |
| PBL 50 | 0.678 | −0.339 | 2.376 |
| PBM 51 | 0.681 | −0.359 | 2.476 |
| PCA 52 | 0.620 | −0.219 | 1.984 |
| PCB 53 | 0.623 | −0.216 | 2.094 |
| PCC 54 | 0.627 | −0.218 | 2.204 |
| PCD 55 | 0.629 | −0.224 | 2.314 |
| PCE 56 | 0.631 | −0.234 | 2.424 |
| PDA 57 | 0.530 | −0.163 | 1.573 |
| PDB 58 | 0.542 | −0.153 | 1.683 |
| PDC 59 | 0.555 | −0.147 | 1.793 |
| PDD 60 | 0.566 | −0.143 | 1.903 |
| PFA 61 | 0.729 | −0.483 | 2.553 |
| PFB 62 | 0.697 | −0.409 | 2.553 |
| PGA 63 | 0.767 | −0.583 | 2.613 |
| PGB 64 | 0.734 | −0.500 | 2.615 |
| PGC 65 | 0.701 | −0.426 | 2.619 |
| PGD 66 | 0.670 | −0.352 | 2.622 |
| PGE 67 | 0.638 | −0.273 | 2.622 |
| PGF 68 | 0.607 | −0.193 | 2.622 |
| PGG 69 | 0.578 | −0.112 | 2.622 |
| PGH 70 | 0.548 | −0.031 | 2.622 |
| RAA 71 | 0.706 | −0.591 | 1.160 |
| RAB 72 | 0.613 | −0.559 | 1.182 |
| RAC 73 | 0.527 | −0.498 | 1.198 |
| RAD 74 | 0.439 | −0.471 | 1.209 |
| RAE 75 | 0.370 | −0.470 | 1.213 |
| RBA 76 | 0.948 | 0.060 | 1.138 |
| RCA 77 | 0.933 | −0.144 | 1.145 |
| RDA 78 | 0.928 | −0.761 | 1.075 |
| REA 79 | 0.843 | −0.732 | 1.098 |
| REB 80 | 0.285 | −0.530 | 1.148 |
| REC 81 | 0.223 | −0.501 | 1.099 |
| SAB 83 | 0.391 | 0.280 | 1.684 |
| SAC 84 | 0.399 | 0.288 | 1.775 |
| SAD 85 | 0.408 | 0.296 | 1.866 |
| SAE 86 | 0.416 | 0.305 | 1.958 |
| SAF 87 | 0.425 | 0.316 | 2.052 |
| SAG 88 | 0.434 | 0.328 | 2.148 |
| SAH 89 | 0.443 | 0.341 | 2.244 |
| SBA 90 | 0.483 | 0.312 | 2.104 |
| SBB 91 | 0.494 | 0.317 | 2.194 |
| SBC 92 | 0.502 | 0.323 | 2.289 |
| TAA 93 | 0.752 | −0.511 | 2.671 |
| TAB 94 | 0.719 | −0.437 | 2.674 |

TABLE 1-continued

| HOLE ID | X | Y | Z |
|---|---|---|---|
| TAC 95 | 0.686 | −0.363 | 2.676 |
| TAD 96 | 0.656 | −0.289 | 2.678 |
| TAE 97 | 0.628 | −0.214 | 2.679 |
| TAF 98 | 0.600 | −0.139 | 2.679 |
| TAG 99 | 0.573 | −0.064 | 2.679 |
| TAH 100 | 0.545 | 0.012 | 2.678 |
| TAJ 101 | 0.516 | 0.086 | 2.677 |
| TAK 102 | 0.484 | 0.169 | 2.674 |
| TBA 103 | 0.379 | 0.318 | 2.667 |

The X, Y and Z coordinates for the cooling holes 88 illustrated in at least FIGS. 3 and 4A-4C and the values in Table 1 are distances given in inches from a point of origin O on the turbine blade 74, which is defined by reference numeral 100 in FIG. 3.

It is, of course, understood that other units of dimensions may be used for the dimensions in Table 1. As mentioned above, the X, Y and Z values mentioned above may in one embodiment have in average a manufacturing tolerance of about ±0.060 inches due to manufacturing and assembly tolerances. In yet another embodiment, the X, Y and Z values mentioned above may in average a manufacturing tolerance of about ±0.040 inches due to manufacturing and assembly tolerances. In still yet another embodiment, the center of the impingement holes or cooling may have a true position tolerance of up to ±0.020 inches due to manufacturing and assembly tolerances. It is, of course, understood that values or ranges greater or less than the aforementioned tolerance are considered to be within the scope of various embodiments of the present disclosure.

Substantial conformance with the coordinate of Table 1 is based on points representing the film cooling hole 88 locations, for example in inches or millimeters, as determined by selecting particular values of scaling parameters. A substantially conforming blade has film cooling holes that conform to the specified sets of points, within the specified tolerance.

Alternatively, substantial conformance is based on a determination by a national or international regulatory body, for example in a part certification or part manufacture approval (PMA) process for the Federal Aviation Administration, Transport Canada, the European Aviation Safety Agency, the Civil Aviation Administration of China, the Japan Civil Aviation Bureau, or the Russian Federal Agency for Air Transport. In these configurations, substantial conformance encompasses a determination that a particular part or structure is identical to, or sufficiently similar to, the specified blade, or that the part or structure is sufficiently the same with respect to a part design in a type-certified or type-certificated blade, such that the part or structure complies with airworthiness standards applicable to the specified blade. In particular, substantial conformance encompasses any regulatory determination that a particular part or structure is sufficiently similar to, identical to, or the same as a specified blade, such that certification or authorization for use is based at least in part on the determination of similarity.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A turbine blade for a gas turbine engine having a plurality of cooling holes defined therein, wherein the plurality of cooling holes are located in the turbine blade according to coordinates of Table 1 and at least some of the plurality of cooling holes are located in an airfoil of the turbine blade, wherein the coordinates of Table 1 are distances in inches from a point of origin O on the turbine blade, the point of origin being located at a center point of an inner diameter edge of a forward root face of a root of the turbine blade and wherein the coordinates of Table 1 have a tolerance of ±0.060 inches.

2. The turbine blade of claim 1, wherein the turbine blade is a first stage turbine blade of a high pressure turbine of the gas turbine engine.

3. The turbine blade of claim 2, wherein the at least some of the plurality of cooling holes have a hole diameter in a range of 0.010 inches to 0.020 inches.

4. The turbine blade of claim 3, further comprising a platform, the airfoil extending from the platform, wherein the platform, the root, and the airfoil are cast as a single part.

5. The turbine blade of claim 1, wherein the at least some of the plurality of cooling holes have a hole diameter in a range of 0.010 inches to 0.020 inches.

6. The turbine blade of claim 5, further comprising a platform, the airfoil extending from the platform, wherein the platform, the root, and the airfoil are cast as a single part.

7. The turbine blade of claim 1, further comprising a platform, the airfoil extending from the platform, wherein the platform, the root, and the airfoil are cast as a single part.

8. A turbine rotor assembly for a gas turbine engine, comprising:
 a rotor disk;
 a plurality of turbine blades secured to the rotor disk, each turbine blade having a plurality of cooling holes defined therein, wherein the plurality of cooling holes are located in each turbine blade according to coordinates of Table 1 and at least some of the plurality of cooling holes are located in an airfoil of the turbine blade, wherein the coordinates of Table 1 are distances in inches from a point of origin O on each turbine blade, the point of origin being located at a center point of an inner diameter edge of a forward root face of a root of each turbine blade and wherein the coordinates of Table 1 have a tolerance of ±0.060 inches.

9. The turbine rotor assembly of claim 8, wherein the turbine rotor assembly is a first stage turbine rotor assembly of a high pressure turbine of the gas turbine engine.

10. The turbine rotor assembly of claim 9, wherein the at least some of the plurality of cooling holes have a hole diameter in a range of 0.010 inches to 0.020 inches.

11. The turbine rotor assembly of claim 10, wherein each of the plurality of turbine blades further comprise a platform and a root, the airfoil extending from the platform, wherein the platform, the root, and the airfoil are cast as a single part.

12. The turbine rotor assembly of claim 8, wherein the at least some of the plurality of cooling holes have a hole diameter in a range of 0.010 inches to 0.020 inches.

13. The turbine rotor assembly of claim 12, wherein each of the plurality of turbine blades further comprise a platform, the airfoil extending from the platform, wherein the platform, the root, and the airfoil are cast as a single part.

14. The turbine rotor assembly of claim 8, wherein each of the plurality of turbine blades further comprise a platform, the airfoil extending from the platform, wherein the platform, the root, and the airfoil are cast as a single part.

15. A method of cooling a suction side of an airfoil of a turbine blade of a gas turbine engine, comprising:
forming a plurality of cooling holes in the turbine blade, wherein the plurality of cooling holes are located in the turbine blade according to coordinates of Table 1 and at least some of the plurality of cooling holes are located in an airfoil of the turbine blade, wherein the coordinates of Table 1 are distances in inches from a point of origin O on the turbine blade, the point of origin being located at a center point of an inner diameter edge of a forward root face of a root of the turbine blade and wherein the coordinates of Table 1 have a tolerance of ±0.060 inches.

16. The method of claim 15, wherein the turbine blade is a first stage turbine blade of a high pressure turbine of the gas turbine engine.

17. The method of claim 16, wherein the at least some of the plurality of cooling holes have a hole diameter in a range of 0.010 inches to 0.020 inches.

18. The method of claim 17, wherein the turbine blade further comprises a platform, the airfoil extending from the platform, wherein the platform, the root, and the airfoil are cast as a single part.

19. The method of claim 15, wherein the at least some of the plurality of cooling holes have a hole diameter in a range of 0.010 inches to 0.020 inches.

20. The method of claim 15, wherein the turbine blade further comprises a platform, the airfoil extending from the platform, wherein the platform, the root, and the airfoil are cast as a single part.

* * * * *